US010406891B2

(12) United States Patent
Gareis et al.

(10) Patent No.: US 10,406,891 B2
(45) Date of Patent: Sep. 10, 2019

(54) DEVICE FOR CONTROLLING AN AIR STREAM

(71) Applicant: Dr. Schneider Kunststoffwerke GmbH, Kronach (DE)

(72) Inventors: Jenny Gareis, Wallenfels (DE); Jürgen Seemann, Kronach (DE); Gerhard Endres, Mainleus (DE)

(73) Assignee: DR. SCHNEIDER KUNSTSTOFFWERKE GMBH (DE)

( * ) Notice: Subject to any disclaimer, the term of this patent is extended or adjusted under 35 U.S.C. 154(b) by 94 days.

(21) Appl. No.: 15/567,924

(22) PCT Filed: May 10, 2016

(86) PCT No.: PCT/EP2016/060406
§ 371 (c)(1),
(2) Date: Oct. 19, 2017

(87) PCT Pub. No.: WO2016/180813
PCT Pub. Date: Nov. 17, 2016

(65) Prior Publication Data
US 2018/0086182 A1 Mar. 29, 2018

(30) Foreign Application Priority Data

May 11, 2015 (DE) .................. 10 2015 006 085
Oct. 29, 2015 (DE) .................. 10 2015 118 549

(51) Int. Cl.
*B60H 1/34* (2006.01)

(52) U.S. Cl.
CPC ... *B60H 1/3421* (2013.01); *B60H 2001/3464* (2013.01); *B60H 2001/3471* (2013.01); *B60H 2001/3478* (2013.01)

(58) Field of Classification Search
CPC .......... B60H 2001/3471; B60H 1/3421; B60H 1/3414; B60H 1/3428; B60H 1/0065
(Continued)

(56) References Cited

U.S. PATENT DOCUMENTS 3,552,295 A * 1/1971 Armstrong ........... B60H 1/3421
454/315
4,043,258 A * 8/1977 Zitko ................... B60H 1/3428
137/601.06
(Continued)

FOREIGN PATENT DOCUMENTS

DE 298 14 953 11/1998 ............... B60H 1/34
DE 20 2010 013 073 4/2011 ............... B60H 1/34
(Continued)

OTHER PUBLICATIONS

International Search Report (with translation) and Written Opinion (with machine translation) issued in PCT/EP2016/060406, dated Aug. 16, 2016, 13 pgs.
(Continued)

*Primary Examiner* — Vivek K Shirsat
(74) *Attorney, Agent, or Firm* — Hayes Soloway P.C.

(57) ABSTRACT

A device for controlling an air stream includes a control slat swively mounted in a housing and second slats extending orthogonally with respect to the control slat and swively mounted in the housing. The direction of the air stream exiting from the housing and the quantity of air streaming out can be set by the slats. An operating element is arranged orthogonally with respect to the longitudinal axis of the control slat to swivel and is coupled to a first bevel gear rotatably mounted on the bearing web and to the control slat. The first bevel gear is in engagement with a second bevel gear which is coupled to a lever arrangement which has at least one rotatably mounted first coupling member which is
(Continued)

coupled to at least one first coupling rod and the at least one first coupling rod is coupled to the second slats.

20 Claims, 10 Drawing Sheets

(58) Field of Classification Search
USPC ........ 454/155, 152, 154, 315, 316, 326–329
See application file for complete search history.

(56) References Cited

U.S. PATENT DOCUMENTS

| 2015/0174989 | A1* | 6/2015 | Oe | B60H 1/34 |
| | | | | 454/152 |
| 2016/0282008 | A1* | 9/2016 | Nemoto | F24F 13/06 |

FOREIGN PATENT DOCUMENTS

| DE | 20 2012 100 243 | 5/2012 | ............... B60H 1/34 |
| DE | 20 2012 100 980 | 7/2012 | ............... B60H 1/34 |
| DE | 10 2011 050 435 | 11/2012 | ............... B60H 1/34 |
| DE | 10 2013 100 534 | 7/2013 | ............... B60H 1/34 |
| EP | 1 712 384 | 10/2006 | ............... B60H 1/34 |

OTHER PUBLICATIONS

German Office Action (w/machine translation) issued in application No. 10 2015 118 549.0, dated Dec. 13, 2016 (5 pgs).

\* cited by examiner

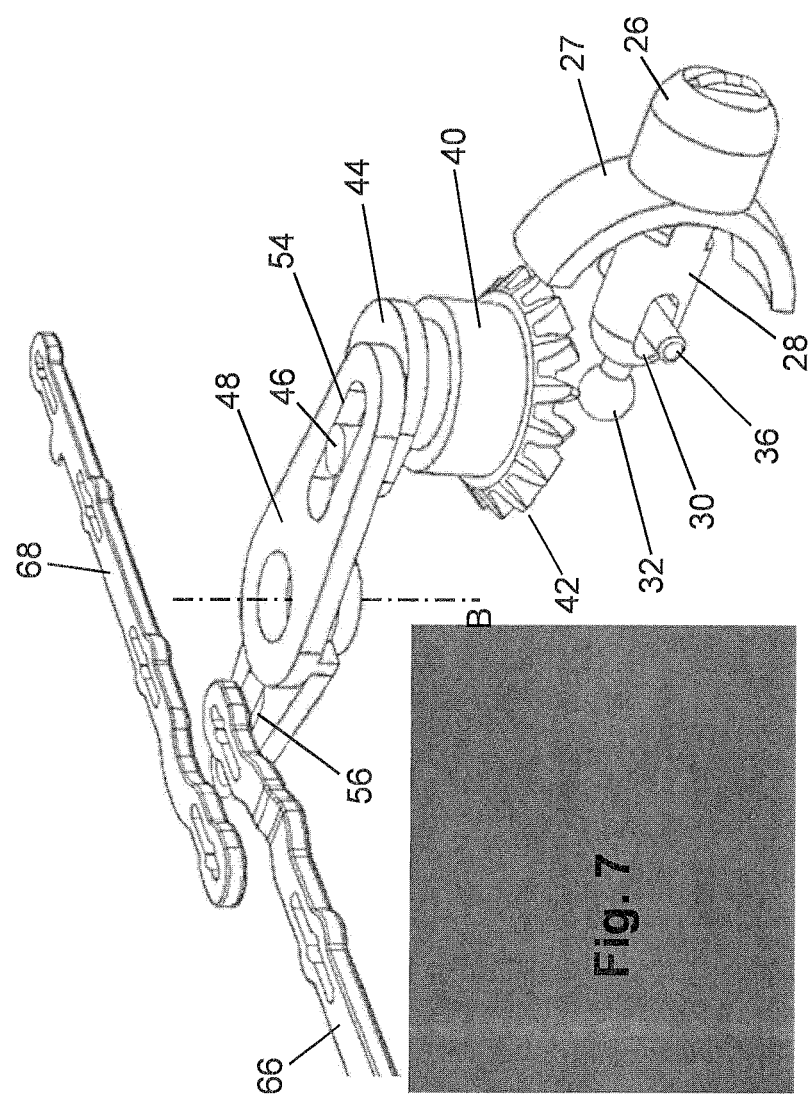

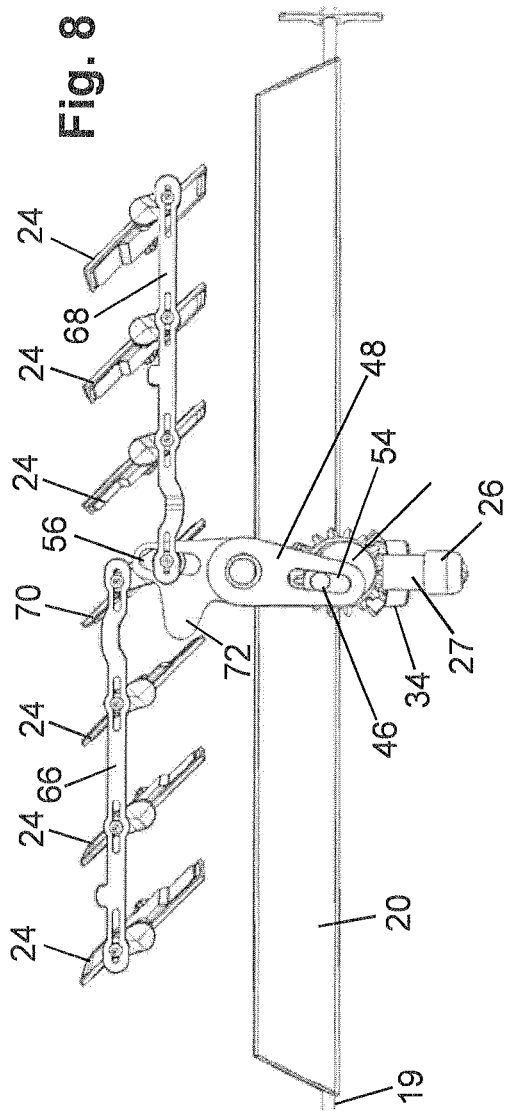
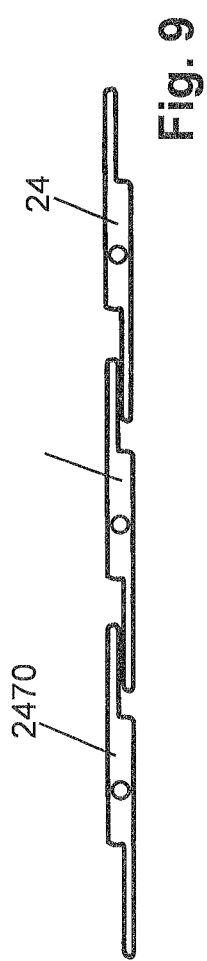

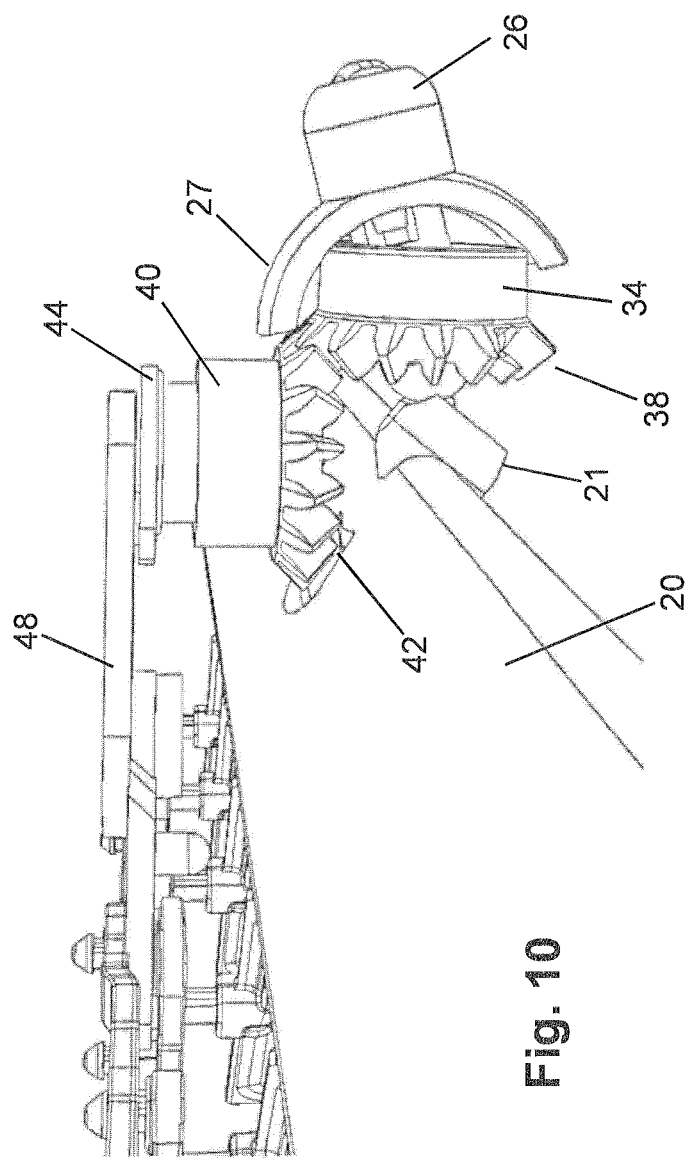

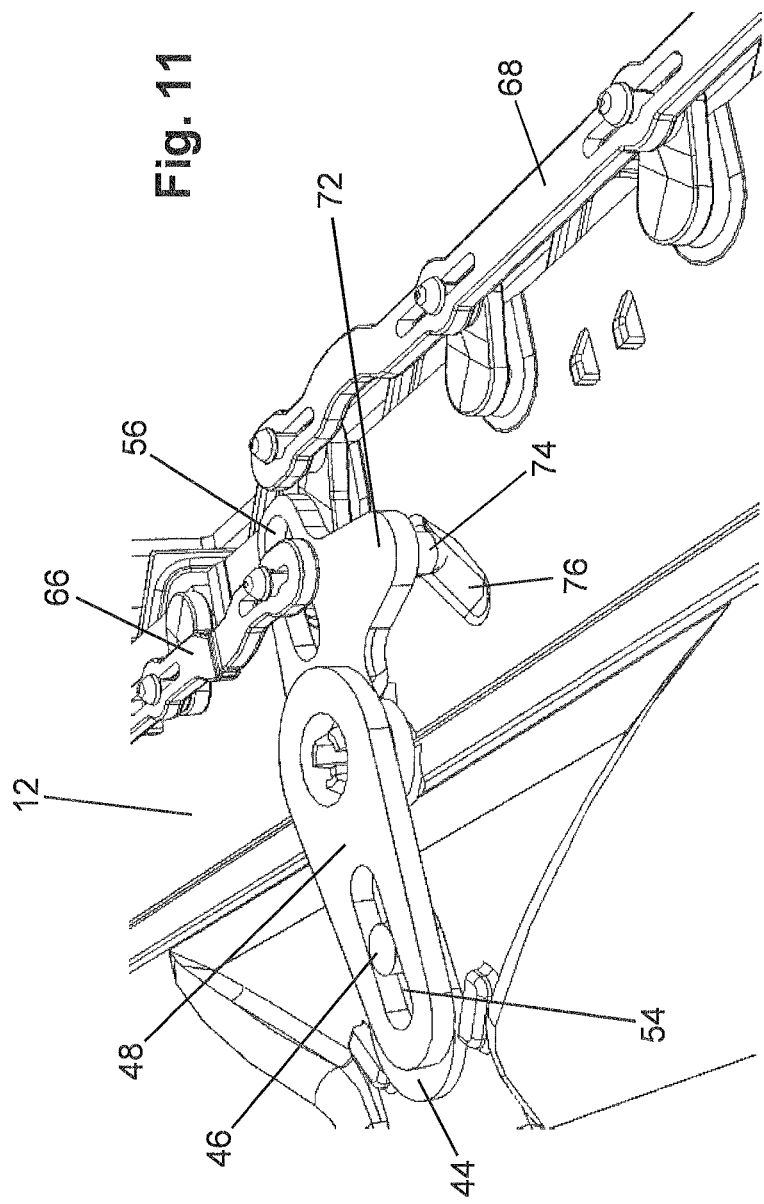

DEVICE FOR CONTROLLING AN AIR STREAM

BACKGROUND OF THE INVENTION

A device for controlling an air flow with at least one control slat pivotably mounted in a housing and with second slats extending orthogonally to the control slat and pivotably mounted in the housing is described, wherein the direction of the air flow exiting from the housing is settable by way of the control slat and the second slats and the amount of the exiting air is settable by way of the second slats.

Various devices for controlling an air flow are known from the prior art, in which both the direction of the outflowing air and the amount of the outflowing air are settable by way of vertical slats arranged behind a control slat. Air direction and air quantity cannot be set independently of one another. The rear slats control the air direction and in the extreme setting close the air outlet.

DE 10 2013 100 534 A1 discloses a device for controlling an air flow, wherein a front horizontal slat constructed as a control slat has a mount in which a circular control element is received. A change in the orientation of vertical slats can be effected by way of the control element by a rotational movement.

From DE 20 2012 100 980 U1, a device for controlling an air flow is disclosed. The device has at least one first control lamella and second lamellae, which are mounted orthogonally to the first control lamella. Furthermore, an operating element is provided by means of which the alignment of the at least one first lamella and the second lamellae is made possible.

DE 298 14 953 U1 discloses a fresh-air nozzle device for a motor vehicle, in which control of the quantity of outflowing air is similarly settable by way of the vertical slats. Adjusting devices arranged outside the housing and in the form of control wheels are provided for pivotation or swiveling the slats.

However, the devices known from the prior art have the disadvantage that only an inadequate closure of the air feed shaft is possible by way of the rear vertical slats. In particular, in the case of devices for control of an air flow with control elements arranged in the region of the slats it is not possible to transmit to the rear vertical slats by way of the control element a sufficient force to enable a sealing closure. In addition, the devices known from the prior art with substantially centrally arranged control elements have the disadvantage that these comprise a plurality of components which project into the flow channel of the air vent and thus produce an additional, but undesired, deflection of the air.

SUMMARY OF THE INVENTION

It is therefore the object to indicate a device for controlling an air flow, which eliminates the disadvantages of the prior art and provides an economic, simple and reliable control of the air outflow direction and the amount of outflowing air.

In the case of a device, which fulfils the aforesaid object, for controlling an air flow, comprising at least one first control slat pivotably mounted in a housing and second slats extending orthogonally to the first control slat and pivotably mounted in the housing, the direction of the air flow exiting from the housing being settable by way of the first control slat and the second slats and the amount of the exiting air being settable by way of the second slats, and a control element arranged by way of a mounting web at an air outlet region of the housing:

the control element is arranged at the mounting web to be pivotable orthogonally to the longitudinal axis of the control slat and is coupled with a first bevel gear, which is rotatably mounted at the mounting web, and with the first control slat, the first bevel gear is disposed in engagement with a second bevel gear, the second bevel gear is arranged at the housing to be rotatable orthogonally to the first bevel gear, the second bevel gear is coupled with a lever arrangement and the lever arrangement comprises at least one rotatably mounted first coupling element, the first coupling element being coupled with at least one first coupling rod and the at least one first coupling rod being coupled with the second slats.

The device can be constructed as, for example, an air vent and can be arranged in a dashboard of a motor vehicle. The device enables sealing closure of an air channel extending through the housing, since by way of the lever arrangement the second slats are pivoted by pressure. In the case of the devices known from the prior art, the rear vertical slats are always pulled, as a result of which the torque required for sealing closure of the air channel cannot be applied to the second slats. If, however, the second slats are pivoted by way of a lever arrangement, then an appropriate moment can be transmitted to the slats so that these adopt the desired setting. In that regard, the lever arrangement is so constructed and arranged at the housing that this, in simple manner, applies a high moment to the second slats. It is thereby possible to carry out closing of the air channel by way of the second slats not only more simply, but also more securely. The mounting web can, for example, be arranged centrally in the area of the air outlet region of the housing. The important components for pivotation or swiveling of the slats are therefore arranged in the region of the mounting element and not at the control slat. This on the one hand does not cause deflection of the air flow by components at the control slat and in addition prevents warping of the control slat, since pressure does not have to be applied to the control slat by way of control elements. In the case of the device described here the control element is supported on the mounting web. Consequently, in the case of this device it is also possible to dispense with additional means for stiffening or supporting the control slat. This device is advantageous particularly in the case of very wide air vents, since warping of a very lengthy control slat can be prevented. Moreover, the control slat can be a vertically extending slat or a horizontally extending slat. The arrangement of the device and the individual components in horizontal or vertical direction can be undertaken as desired.

The control slat can be pivoted, by way of the control element through pivotation or swiveling, in order to deflect the air in a first direction. In addition, through rotation of the control element it is possible by way of the first bevel gear, the second bevel gear, the lever arrangement and the first coupling element coupled therewith for the second slats to be pivoted so as to deflect the air in a second direction and at the same time set the amount of outflowing air.

In further forms of embodiment one of the second slats is constructed as a second control slat and the first coupling element is connected with the second control slat, wherein parallelly arranged second slats extend on either side of the second control slat, wherein the first coupling element is rotatably connected at a first end section with the first coupling rod and at a second end section with a second coupling rod and a first group of second slats is connected with the first coupling rod and a second group of second slats is connected with the second coupling rod. When the control element is turned or rotated a displacement of the first coupling rod and the second coupling rod takes place by way of the elements coupled with the control element so that the second slats are urged into their closed position. For that purpose, a corresponding torque is transmitted to the second slats, in which case the first coupling rod and the second coupling rod are moved away from one another.

The first coupling element can be rotatable in common with the second control slat about the pivot axis thereof and can be connected at a spacing from the pivot axis of the second slats with the first coupling rod and the second coupling rod. In embodiments of that kind the first coupling element can be constructed as an extension of a bearing pin of the second control slat. The first coupling element has for that purpose two end sections which protrude orthogonally from the pivot axis and at which entrainers for the coupling rods and a lever element of the lever arrangement are arranged. In addition, the other second slats can have an extension at the bearing pins thereof, which define the axis of rotation of the second slats. Arranged at these extensions is an entrainer which is received in corresponding openings in the first and second coupling rods. These entrainers are similarly arranged at a spacing from pivot axes extending through the bearing pins of the second slats.

The lever arrangement can comprise a second coupling element, which is rotatably coupled with the second bevel gear, with a first entrainer arranged eccentrically with respect to the axis of rotation of the second coupling element, and a lever element, which is rotatably arranged at the housing, with a first gate guide and a second gate guide, which are respectively arranged at a spacing from the axis of rotation of the lever element at opposite sections, wherein the first entrainer is mounted to be guidable in the first gate guide and the second entrainer is mounted to be guidable in the second gate guide, and wherein a second entrainer is arranged in the first end section of the first coupling element and rotatably connected with the first coupling rod. By virtue of the configuration of the lever arrangement, the rotation of the second bevel gear can be converted in simple mode and manner into a displacing movement of the first coupling rod and the second coupling rod. In addition, the first coupling rod and the second coupling rod can execute a compensating movement perpendicularly to the displacement direction.

In the region of the second gate guide the lever element can have at least one abutment which by way of the first coupling rod and/or by way of the second coupling rod or by way of a guide of the housing limits the pivotation or swiveling of the second slats. The abutment prevents over-rotation of the control element. The abutment prevents the second slats from being moved out of a closed position in which the second slats are arranged substantially in a plane. Depending on the construction of the lever arrangement, particularly the spacings of the lever element, the first coupling element and the entrainers at the coupling elements, different operating forces or moments can be transmitted. Since the forces and moments transmitted by way of the lever arrangement are greater than the forces and moments in the case of the displaceably or rotatably mounted control elements known from the prior art, advantageously sealing closure of an air channel can indeed be achieved by way of the second slats, but it also has to be ensured that turning or rotation beyond a definable range does not take place. In alternative forms of embodiment the second slats and the second control slat in the closed position thereof can bear against an abutment or several abutments in the housing, which projects or project into the flow channel or air channel.

The control element can have a third gate guide which extends along the longitudinal axis of the control element and a third coupling element, which is connected with the first bevel gear, can be arranged in the third gate guide. This embodiment ensures that, even in the case of pivotation or swiveling of the control element, turning or rotation of the first bevel gear can be executed. The third gate guide can in that case be formed as a slot and the third coupling element as a pin. The third coupling element or the pin can be arranged to extend transversely through an inner opening extending substantially through the axis of rotation of the first bevel gear. The first bevel gear is in that case received by way of an outer section of the first bevel gear in a mounting at the mounting web. In these embodiments the control element then extends through the first bevel gear.

The control element can additionally have a spherical end section which is received in a ball socket of the first control slat. The first control slat otherwise has no further parts such as mounts, bearing sections or coupling elements which project into an air flow channel in the air channel of the device and thus produce turbulence in the outflowing air. The spherical connection between the control slat and the control element ensures that pivotation or swiveling can be executed in all positions of the control slat and the second slats as well as of the control element. The spherical end section is preferably received in the ball socket in such a way that after introduction of the end section of the control element this can no longer be removed from the ball socket. This could be effected, for example, by way of a so-called clip connection.

In further forms of embodiment the second slats can have a cross-section with at least one step. In embodiments of that kind the second slats and thus also the second control slat have at least two flat sections arranged to be offset relative to one another. If the second slats are disposed in the closed setting thereof so as to close off the air channel and prevent the feed of air, the flat sections, which are arranged offset relative to one another, of the second slats bear one against the other. The second slats can also be constructed so that these have a step only in the respective contact regions. The contact regions are the sections of the second slats at which these in the closed position lie against adjacent second slats or bear against corresponding contact projections in the housing of the device.

The second slats can have a seal at least at the outer edges thereof extending parallel to the pivot axis and the housing can have in the region of the second slats a seal at least at inner side walls extending parallel to the pivot axis of the second slats. However, the seal at the second slats and in the housing can also be provided in encircling manner. The seal additionally improves sealing in a closed position of the second slats. The sealing means should preferably be selected so as to be flexible and resilient. In this way it is ensured that the sealing elements bear against the second slats and do not obstruct pivotation or swiveling thereof. For preference, plastics material foams or caoutchouc elements/caoutchouc foams or foams of rubber or foams of/with rubber components or elements or rubber can be used for that purpose.

The at least one lever element, the first coupling rod and the second coupling rod and the first coupling element can be arranged outside the housing. The aforesaid components therefore do not protrude into an air channel and obstruct the outflowing air or produce turbulence in the outflowing air. Devices of that kind have a control element arranged centrally in an air outlet section and in additionally enable air deflection without the components, which are provided for pivotation or swiveling and closure, producing an undesired additional air deflection.

The first control slat can be coupled with at least one further slat pivotably mounted on the housing.

In the case of devices with a low height often only one control slat is required. If, however, the device has a greater height then several slats arranged parallel to the control slat can be provided. The slats arranged parallel to the first control slat are in that case preferably coupled outside the housing with the first control slat by way of appropriate control elements and a further coupling rod.

Due to the fact that the important kinematic components—such as the first coupling rod, the lever element and/or the second coupling rod as well as the first coupling element—are arranged outside the housing, cross-sectional losses such as known from the prior art are avoided. In addition, in the case of the devices known from the prior art the important kinematic components are often visible, which detracts from the visual appearance of air vents of that kind. The just-described devices solve this problem, since the important components such as, for example, the lever arrangement are arranged outside the housing. Moreover, a further advantage in the case of the afore-described devices is that no cut-outs are needed in one of the slats, for example in the second slats. Thus, for example, DE 10 2013 100 534 A1 discloses the possibility of bringing the vertical slats into a closed position, but in the case of all embodiments at least one slat is provided with a large-area cut-out which unsatisfactorily fulfils air deflection and moreover produces additional turbulence in an air flow. Usually such cut-outs are required primarily for vertical slats in devices from the prior art, since the control element of these devices requires a point of engagement with the vertical slats.

Lighting elements such as light-emitting diodes, optical conductors or other means can also be provided at the devices. For example, a light source can be arranged in the region of the mounting web, which light source by way of optical conductors provides illumination of the first control slat, the second slats or parts of the housing.

BRIEF DESCRIPTION OF THE DRAWINGS

Further advantages, features and possibilities of embodiment are evident from the following figure description of embodiments, which are to be understood as non-limiting.

In the drawings:

FIG. 7 shows a further perspective illustration, to enlarged scale, of components of a device for controlling an air flow;

FIG. 8 shows a further plan view of components of a device for controlling an air flow;

FIG. 9 shows a schematic plan view of slats of a device for controlling an air flow, in a closed setting;

FIG. 10 shows a further perspective illustration, to enlarged scale, of components of a device for controlling an air flow, with a pivoted first control slat; and FIG. 11 shows a perspective illustration of a device for controlling an air flow of a further form of embodiment.

DETAILED DESCRIPTION OF THE INVENTION

Figure 1:
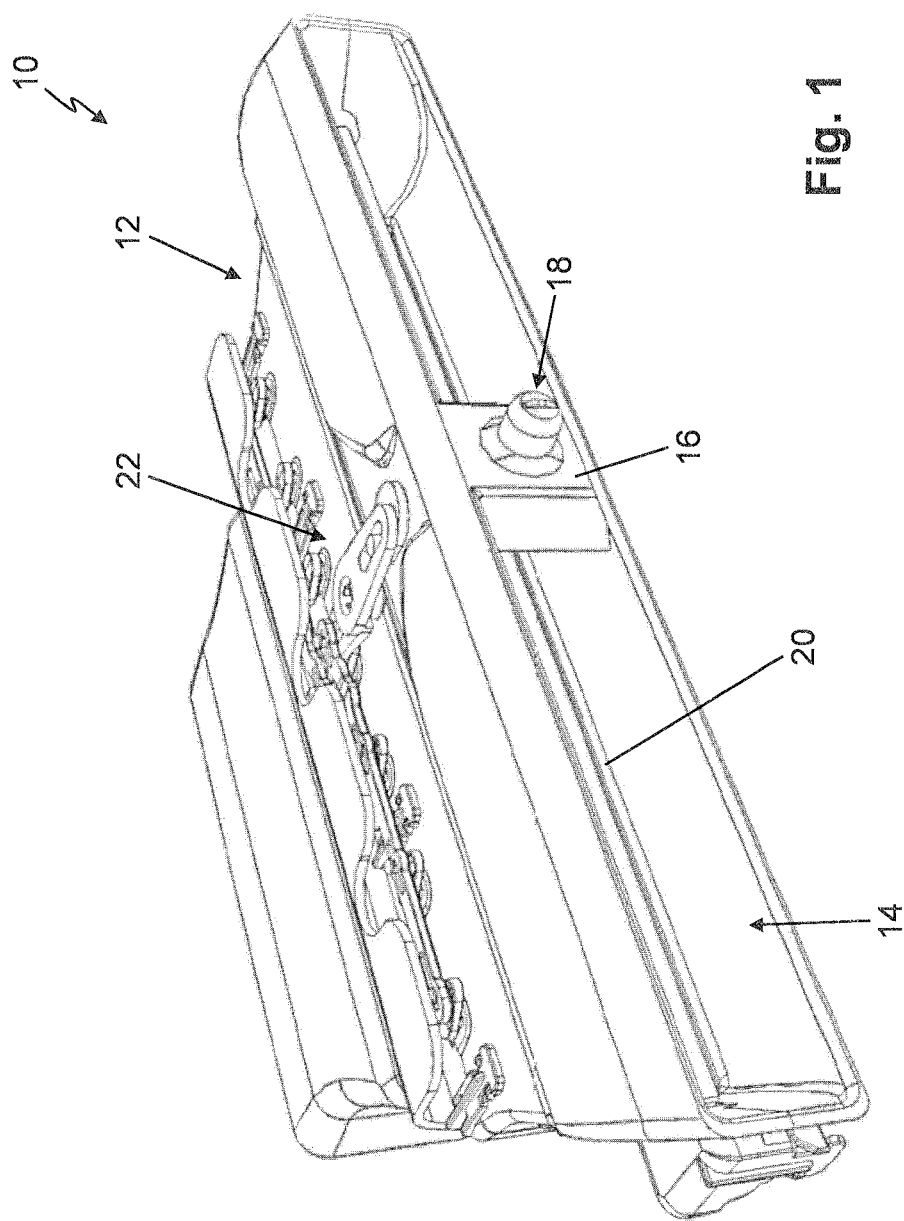
FIG. 1 shows a perspective illustration of a device for controlling an air flow.

Parts which are provided in the figures with the same reference numerals substantially correspond with one another insofar as nothing to the contrary is indicated. Moreover, description of those components of the device 10 for controlling an air flow which are not essential to understanding of the technical teaching disclosed herein is dispensed with.

The devices 10 shown in the figures can be arranged, for example, in the region of a centre console of a vehicle dashboard. The devices 10 are in that case constructed as so-called broadband vents. This means that the devices 10 have a greater width than height in an air outlet region 14. The air outlet region 14 preferably has a width of more than 200 millimeters, preferably a width of more than 300 millimeters.

In the following description the terms "turning or rotating" and "pivotation or swiveling" are used synonymously. Thus, for example, pivotable slats are also rotatable about the pivot axes thereof and a rotatably mounted lever element can also be pivoted about its axis of rotation.

The device 10 of FIG. 1 comprises a housing 12. The housing 12 has at the front side thereof an opening defining the air outlet region 14. A mounting web 16 is arranged in the air outlet region 14 and extends substantially centrally through the air outlet region 14. A control element 18 is arranged at the mounting web 16. The control element 18 serves the purpose of pivoting a substantially horizontally extending first control slat 20 and of pivoting, by way of a lever arrangement 22, second slats 24 (not illustrated in FIG. 1) so as to correspondingly deflect the air exiting by way of the air outlet region 14. In addition, the amount of air flowing out by way of the air outlet region 14 can be set via the control element 18. Air quantity and air direction cannot be controlled independently of one another.

The control element 18 is pivotable about an axis extending parallel to the longitudinal axis of the first control slat 20 and can in addition be rotated by way of a control knob 26 transversely to the longitudinal axis of the first control slat 20. The turning or rotation of the control knob 26 produces pivotation or swiveling of the second slats 24 by way of the lever arrangement 22. If the control knob 26 is turned by a specific amount then the second slats 24 are pivoted to such an extent that these substantially lie in one plane and thus close the air channel through the housing 12.

At its rear side the housing 12 has a connection, which is not denoted in more detail, to an air feed channel. The air feed channel can be coupled with, for example, an air conditioning installation so that conditioned air can flow out of the device 10 via the air outlet region 14. The devices 10 shown in FIGS. 1 to 11 can also be termed air vents or air nozzles.

Figure 2:
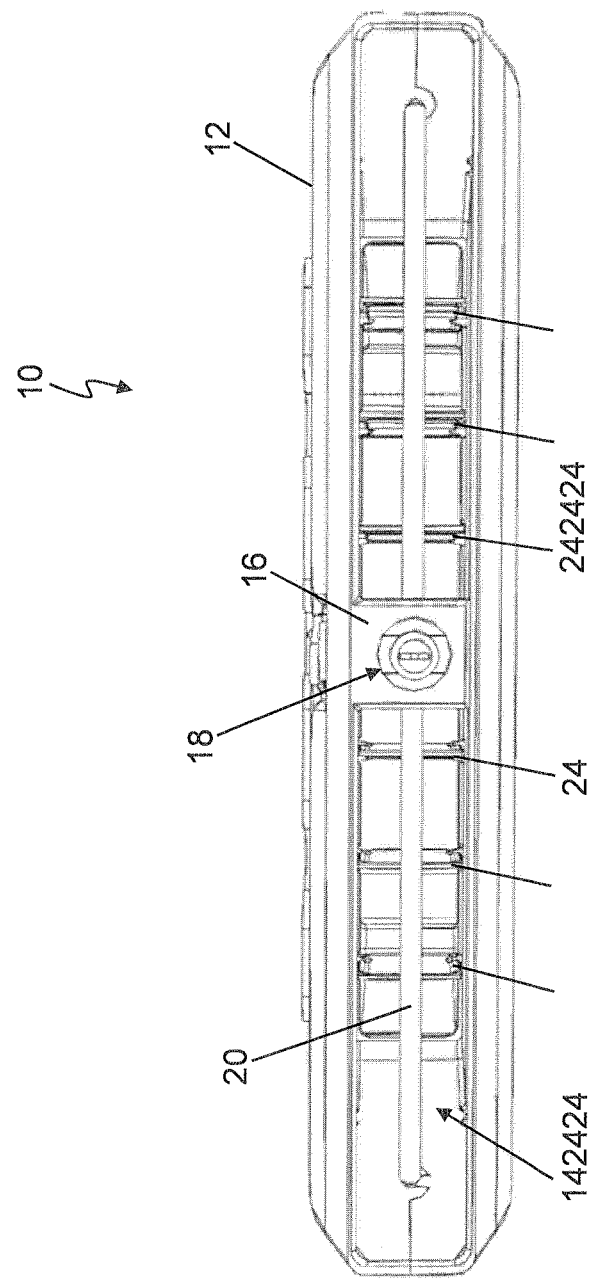
FIG. 2 shows a front view of a device for controlling an air flow.

FIG. 2 shows a front view of a device 10 for controlling an air flow. The mounting web 16 is arranged in the centre of the air outlet region 14. By way of that, the air outlet region 14 is divided into two sub-regions, wherein a first group of second slats 24 is arranged on the left of the mounting web 16 and a second group of second slats 24 is arranged on the right of the mounting web 16. The control element 18 is coupled by way of the lever arrangement 22 with a second control slat 70 (not illustrated in FIG. 2), which is disposed substantially in the region of the mounting web 16 behind this and behind the first control slat 20. The second control slat 70 is coupled by way of a first coupling rod 66 with the second slats 24 of the first group of slats 24 and by way of a second coupling rod 68 with the second group of slats 24.

Figure 3:
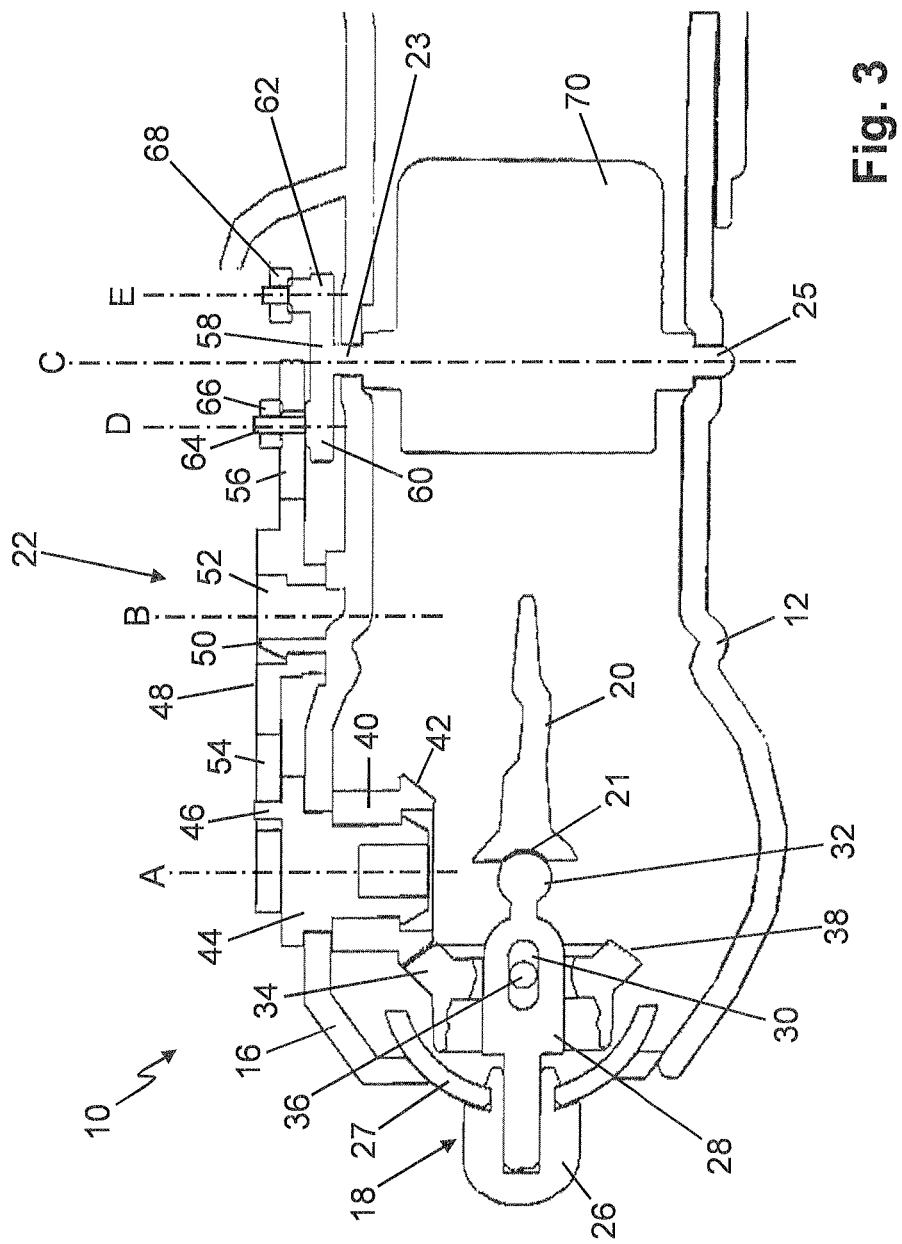
FIG. 3 shows a section through a device for controlling an air flow.

FIG. 3 shows a section through a device 10 for controlling an air flow. FIG. 3 shows the construction and arrangement of the control element 18 and of the lever arrangement 22, and the coupling with the first control slat 20 and the second control slat 70.

The control element 18 comprises the control knob 26, which is connected with a control section 28. The control knob 26 is mounted in an opening in a strip 27. The strip 27 is formed to be curved and serves as a guide for the control element 18 during pivotation or swiveling upwardly and downwardly (FIG. 3). The control section 28 has a third gate guide 30. A third coupling element 36, which is formed as a pin, of a first bevel gear 34 is received in the third gate guide 30. The control section 28 has a ball head 32 at its end opposite the control knob 26. This ball head 32 is received in a ball socket 21 of the first control slat. The ball socket 21 is so constructed, differently from how depicted by the sectional illustration of FIG. 3, that it surrounds the ball head 32 to such an extent that the ball head 32 cannot be moved out of the ball socket 32. The ball socket 21 engages around the ball head 32, but allows pivotation or swiveling of the control element 18 relative to the first control slat 20.

In order to pivot the first control slat 20, the control knob 26 can, as viewed in FIG. 3, be moved upwardly or downwardly, in which case this causes pivotation or swiveling of the control section 28 about the third coupling element 36. Correspondingly, the ball head 32 is pivoted downwardly or upwardly, which due to the mounting in the ball socket 21 produces pivotation or swiveling of the first control slat 20 corresponding with or opposite to the pivotation or swiveling of the control knob 26. The first control slat 20 is therefore pivoted in opposite sense to the pivotation or swiveling of the control knob 26. The construction of the gate guide 30 as a slot ensures that pivotation or swiveling of the control element 18 can be executed without canting. Since the first control slat 20 is rotatably mounted in the housing to be fixed with respect to its longitudinal axis a displacement of the control section 28 takes place when the control element 18 is pivoted or swiveled. Compensation for this displacement is provided by way of the third gate guide 30. In addition, the control element 18 can be rotated about the longitudinal axis of the control section 28 independently of the orientation of the first control slat 20. Since the ball head 32 and the ball socket 21 do not have any edges there is also no tilting or blocking by parts of the device 10 when the control element 18 is turned or rotated. If the control element 18 is turned about the longitudinal axis of the control section 28 the first bevel gear 34 is turned in corresponding manner. For that purpose the bevel gear 34 is rotatably mounted on the mounting web 16.

The first bevel gear 34 has a central opening through which the control section 28 passes. The third coupling element 36 is fixedly connected with the first bevel gear 34 and extends through the opening of the first bevel gear 34. The opening of the first bevel gear 34 is formed to be rounded at the outer sides thereof so that rotation of the control element 18 can take place even when the control element 18 is pivoted. The first bevel gear 34 has an encircling gearwheel section 38 which is disposed in engagement with an encircling gearwheel section 42 of a second bevel gear 40. The teeth of the gearwheel section 38 mesh with the teeth of the gearwheel section 42. The second bevel gear 40 is rotatably mounted on the housing 12 by way of a second coupling element 44. For that purpose the second bevel gear 40 has an inner opening with stepped regions for hook-like projections of the second coupling element 44. The second coupling element 44 and the second bevel gear 40 are fixedly connected together by way of the hook-shaped elements and corresponding sections of the second bevel gear 40 so that rotation of the second bevel gear 40 produces a corresponding rotation of the second coupling element 44 about the axis A of rotation. The second coupling element 44 has an encircling section which is larger than an opening in the housing 12 so that the position of the second coupling element 44 in the opening is secured by way of the detent connection with the second bevel gear 40. The opening in the housing 12 is of such a size that the second coupling element 44 can rotate, preferably free of play, about the axis A of rotation.

The second coupling element 44 has at the upper section an entrainer 46 arranged eccentrically with respect the axis A of rotation. The entrainer 46 is received in a first gate guide 54 of a lever element 48. The lever element 48 is part of the lever arrangement 22 and is similarly mounted on the housing 12 by way of a detent arrangement with, for example, three detent hooks 50 so as to be rotatable about the axis B of rotation. The housing 12 has three detent hooks 50 which are arranged around the axis B of rotation and which project into an opening 52 of the lever element 48 and engage behind a projection. The lever element 48 can be connected with the housing 12 by way of a snap connection by seating on the detent hooks 50. The lever element 48 has, at a section opposite the first gate guide 54, a second gate guide 56 in which a second entrainer 64 is received. The second entrainer 64 either is connected with a first coupling element 58 or is part of the first coupling element 58. The first coupling element 58 is connected with the second control slat 70 by way of a section 23. The second control slat 70 has a bearing pin 25 rotatably mounted in a lower opening in the housing 12. The section 23 similarly serves as a bearing pin for the second control slat 70. The second control slat 70 can be rotated about a pivot axis C extending through the section 23 and the bearing pin 25. The first coupling element 58 has a first end section 60 and an opposite, second end section 62. The second entrainer 64 is arranged in the first end section 60 and is received in an opening of a first coupling rod 66. The first coupling element 58 has, in the second end section 62, a further entrainer which is received in an opening of the second coupling rod 68. The first entrainer 64 can be pivoted in the opening of the first coupling rod 66 about the axis D and the further entrainer can be pivoted in the opening of the second coupling rod 68 about the axis E.

If the control element 18 is turned by way of the control knob 26 about the longitudinal axis of the control section 28 then this causes turning or rotation of the first bevel gear 34. As a consequence thereof the second bevel gear 44 is turned. In corresponding manner, by way of the direct coupling of the second coupling element 44 with the second bevel gear 40 the first entrainer 46 is turned about the axis A of rotation which results in turning or rotation of the lever element 48. Accordingly, the second entrainer 64 is moved due to its mounting in the second gate guide 56, which results in pivotation or swiveling of the second control slat 70. A synchronous pivotation or swiveling of the first group of slats 24 takes place by way of the coupling with the first coupling rod 66. In addition, pivotation or swiveling of the further entrainer in the second end section 62 takes place so that the second group of slats 24 is also pivoted in synchronous manner by way of the coupling with the second coupling rod 68.

If the control element 18 is further turned by way of the control knob 26, the second control slat 70 and the second slats 24 can be brought into a closed position in which they substantially adopt the setting shown in FIG. 9. The slats 24 and the second control slat 70 are pressed into their closed position by way of the lever arrangement 22. In the case of the air vents known from the prior art with vertical slats constructed as closure flaps, the vertical slats are usually pulled by way of a control element mounted at a control slat. However, the lever arrangement 22 produces a pressing action so that a greater force or a greater moment is exerted on the slats 24 and the second control slat 70. A secure closing of the air channel can be achieved in that way.

Figure 4:
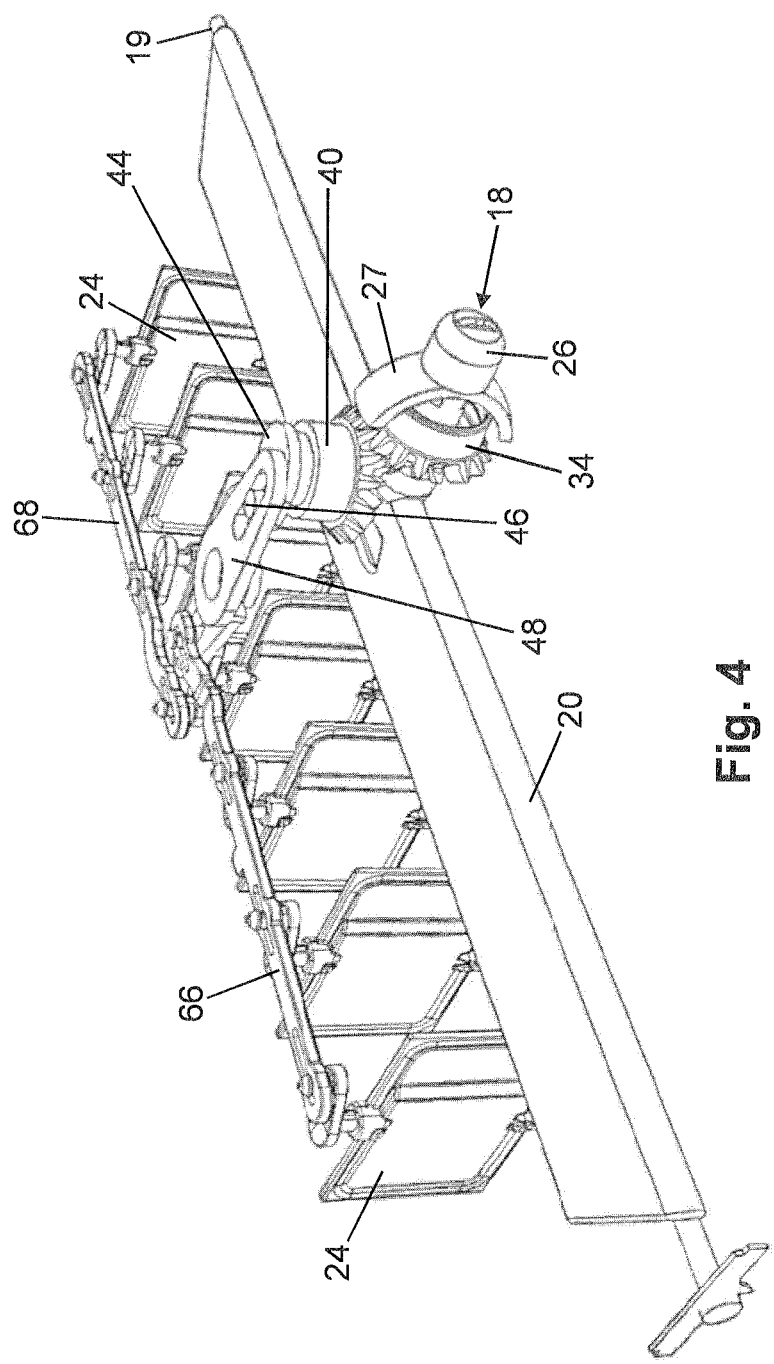
FIG. 4 shows a perspective illustration of components of a device for controlling an air flow.

FIG. 4 shows a perspective illustration of components of a device 10 for controlling an air flow. The housing 12 is not depicted in the illustration shown in FIG. 4. The control slat 20 is received in the housing 12 to be rotatable about bearing pins 19. The pivot axis of the first control slat 20 in that case extends at the front edge thereof. The first control slat 20 has in the region of the second bevel gear 40 an incision which ensures that even when the first control slat 20 is pivoted into a maximum setting there is no contact between the surface of the first control slat and the second bevel gear 40.

FIG. 4 clarifies the construction of the strip 27 and the coupling of the bevel gears 34 and 40 with the components of the lever arrangement 22. If due to rotation of the control element 18 the second bevel gear 40 is turned by way of the first bevel gear 34 the first entrainer 46 moves about the axis A of rotation (not illustrated in FIG. 4). Correspondingly, the lever element 48 is turned about the axis B of rotation (similarly not illustrated), which results in a displacement of the second entrainer 64. Correspondingly, in that case the second control slat 70 is pivoted. Through the direct connection of the second control slat 70 with the first coupling element 58 and the eccentric arrangement of the second entrainer 64 and of the further entrainer, which in turn are coupled with the first coupling rod 66 and the second coupling rod 68, pivotation or swiveling of the first group of slats 24 and the second group of slats 24 takes place.

Figure 5:
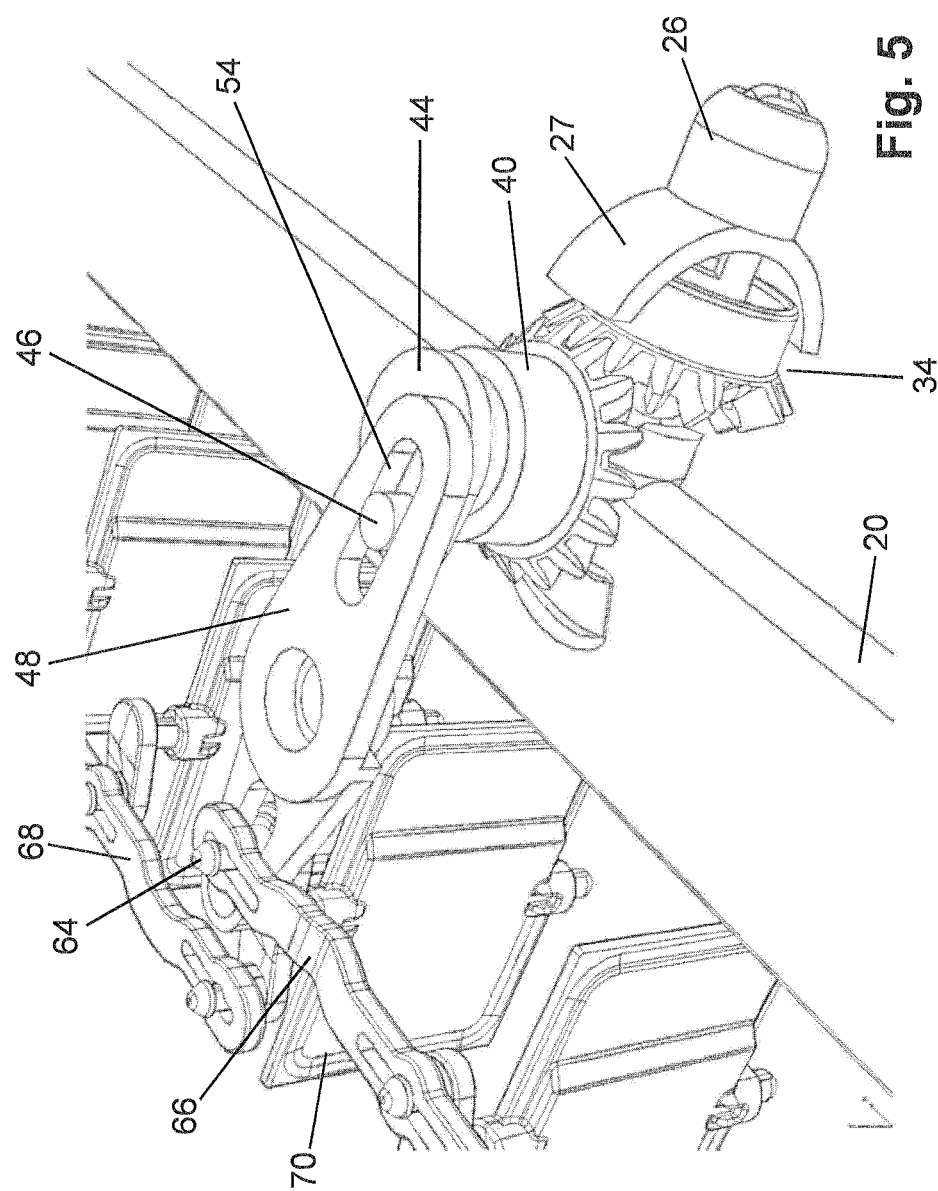
FIG. 5 shows a perspective illustration, to enlarged scale, of components of a device for controlling an air flow.

FIG. 5 shows a perspective illustration to enlarged scale of components of a device 10 for controlling an air flow. FIG. 5 shows an exemplifying construction of the second entrainer 64 and the further entrainer. If the lever element 48 is rotated about the axis B of rotation, the first coupling rod 66 is by way of example moved to the left and accordingly the second coupling rod 68 is moved to the right. The first coupling rod 66 and the second coupling rod 68 in that case execute movements in opposite sense. The first coupling rod 66 and the second coupling rod 68 are either moved towards one another or moved away from one another. The device 10 is preferably so constructed that the second slats 24 and the second control slat 70 are disposed in the closed position thereof when the first coupling rod 66 and the second coupling rod 68 are moved away from one another. In that case, the first coupling rod 66 and the second coupling rod 68 are urged into the extreme settings thereof. By contrast to the pulling or carrying along of slats as is known from the prior art, the slats 24 and the second control slat 70 are therefore brought by a greater pressure or moment into the closed setting thereof. As illustrated in FIG. 5, the second slats 24 can also have a section connected with a bearing pin, wherein an entrainer arranged eccentrically with respect to the pivot axis of the second slats 24 is provided at this section, which entrainers are received in corresponding openings of the first coupling rod 66 and the second coupling rod 68.

Figure 6:
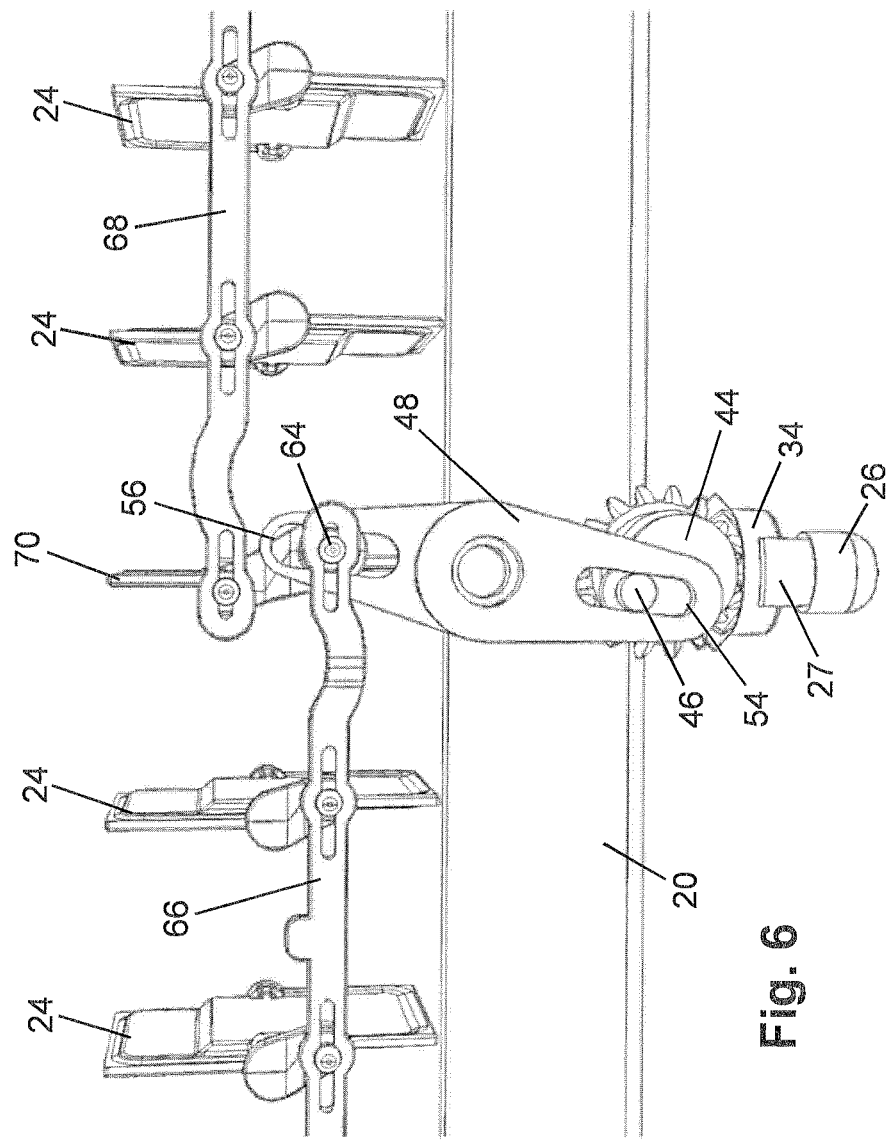
FIG. 6 shows a plan view of components of a device for controlling an air flow.

FIG. 6 shows a plan view of components of a device 10 for controlling an air flow. FIG. 6 clarifies the mode of functioning of the device 10. If the first entrainer 46 is rotated further to the left about the axis A of rotation then rotation of the first entrainer 46 in counter-clockwise sense takes place, in which case the lever element 48 is rotated in clockwise sense (FIG. 6). Correspondingly, the second entrainer 64 is moved to the right in clockwise sense and the second slats 24 and the second control slat 70 pivoted in counter-clockwise sense. If the first entrainer 46 is rotated in clockwise sense a turning or rotation or a pivoting or swiveling of the lever element 48 in counter-clockwise sense takes place, which in turn leads to displacement of the first coupling rod 66 to the left and the second coupling rod 68 to the right. The last-mentioned displacement leads, in its maximum deflection, to the closed position of the second control slat 70 and the second slats 24, as is shown in FIG. 9.

FIG. 7 shows a further perspective illustration, to enlarged scale, of components of a device 10 for controlling an air flow. FIG. 7 shows the construction of the ball head 32 and the reception of the third coupling element 36, which is constructed as a pin, within the third gate guide 30.

FIG. 8 shows a further plan view of components of a device 10 for controlling an air flow. In the illustration of FIG. 8 the second slats 24 and the second control slat 70 are illustrated pivoted. For that purpose the lever element 48 was pivoted in clockwise sense.

FIG. 8 additionally shows an abutment 72 which, for example, by way of a guide 76 can limit a pivotation or swiveling or a turning or rotation of the lever element 48.

FIG. 11 in that case shows a construction of one possibility for limitation of the pivotation or swiveling of the lever element 48.

FIG. 9 shows a schematic plan view of slats 24 and a second control slat 70 of a device 10 for controlling an air flow, in a closed setting. The slats 24 and the second control slat 70 are of step-shaped construction. By virtue of the step-shaped construction the second slats 24 and the second control slat 70 not only bear against one another along the contact edges, but also can advantageously bear against one another over an area. By that means, throughflow of leakage air in the case of a closed air channel is further prevented. In addition, in further forms of embodiment the contact edges or also the contact surfaces (FIG. 9) can be provided with sealing means. Suitable for that purpose are, for example, foams or sealing rings of rubber arranged to encircle the slats. Moreover, the housing 12 can have encircling sealing means which in a closed setting of the slats 24 and 70, as shown in FIG. 9, seal the housing 12 relative to the slats 24 and 70.

FIG. 10 shows a further perspective illustration, to enlarged scale, of components of a device 10 for controlling an airflow with a pivoted first control slat 20. As illustrated in FIG. 10, the first control slat 20 is pivoted in opposite sense to the control element 18. By virtue of the third gate guide 30 (not illustrated in FIG. 10) a tilting or a pivotation or swiveling of the control element 18 upwardly and downwardly can be executed without this having any effect on the operation of the second slats 24 and the second control slat 70 and on turning or rotation of the first bevel gear 34. The strip 27 is so constructed that the control knob 26 can be rotated within the opening of the strip 27. As a result, the orientation of the strip 27 does not change during turning or rotation of the control element 18. The strip 27 can in that case be merely pivoted upwardly and downwardly, but does not disturb the further operation and the strip 27 does not have to be rotated therewith.

FIG. 11 shows a perspective illustration of a device 10 for controlling an air flow in a further form of embodiment with an abutment 72. A pin 74 is arranged at an end of the abutment 72 facing the housing 12. The pin 74 is received within a guide 76. The guide 76 predetermines how far the lever element 48 can be pivoted. By way of that it is ensured in simple mode and manner that excessive force cannot be exerted on the slats 24 and the second control slat 70 such as could lead to, for example, damage of components of the device 10.

As shown in the afore-mentioned exemplifying embodiments the important components of the kinematics for pivotation or swiveling of the second slats 24 and the second control slat 70, namely at least the second coupling element 44, the lever element 48, the first coupling element 58 as well as the first coupling rod 66 and the second coupling rod 68, are disposed outside the housing 12. As a result, these components do not cause any influencing and deflection or turbulent disturbance of the air, which is flowing out by way of the air outlet region 14, in the air channel. In addition, the second control slat 70 does not have to have a cut-out or other constructional features causing additional turbulent disturbance of the air or, in a closed setting of the slats, permitting a leakage air flow due to a cut-out. The second control slat 70 can be constructed within the air channel just like the remaining second slats 24. Moreover, the first control slat 20 does not have mounts, guides or other means which similarly would either enlarge the cross-section of the control slat 20 or result in protrusions or arrangements at the first control slat 20. As a result, an improved closure of the air channel by way of the second slats 24 and the second control slat 70 is provided, wherein in addition no kinematic components are arranged within the air channel.

REFERENCE NUMERAL LIST 10 device
12 housing
14 air outlet region
16 mounting web
18 control element
19 bearing pin
20 control slat
21 ball socket
22 lever arrangement
23 section
24 slat
25 bearing pin
26 control knob
27 strip
28 control section
30 gate guide
32 ball head
34 bevel gear
36 coupling element
38 gearwheel section
40 bevel gear
42 gearwheel section
44 coupling element
46 entrainer
48 lever element
50 detent hook
52 opening
54 gate guide
56 gate guide
58 coupling element
60 end section
62 end section
64 entrainer
66 coupling rod
68 coupling rod
70 control slat
72 abutment
74 pin
76 guide
A axis of rotation
B axis of rotation
C pivot axis
D axis
E axis

The invention claimed is:

1. A device for controlling an air flow, comprising at least one first control slat pivotably mounted in a housing and second slats extending orthogonally to the first control slat and pivotably mounted in the housing, wherein the direction of the air flow exiting from the housing is settable by way of the first control slat and the second slats and the amount of the exiting air is settable by way of the second slats, and a control element arranged by way of a mounting web at an air outlet region of the housing, wherein
   the control element is arranged at the mounting web to be pivotable orthogonally to a longitudinal axis of the first control slat and is coupled with a first bevel gear, which is rotatably mounted at the mounting web, and with the first control slat,
   the first bevel gear is disposed in engagement with a second bevel gear,
   the second bevel gear is rotatably arranged at the housing orthogonally to the first bevel gear,
   the second bevel gear is coupled with a lever arrangement,
   the lever arrangement comprises at least one rotatably mounted first coupling element coupled with at least one first coupling rod and the at least one first coupling rod is coupled with the second slats, and
   wherein the control element has a further gate guide extending along the longitudinal axis of the control element, and a further coupling element, which is connected with the first bevel gear, is arranged in the further gate guide.

2. The device according to claim 1, wherein one of the second slats is constructed as a second control slat and the first coupling element is connected with the second control slat, wherein parallelly arranged second slats extend on either side of the second control slat, wherein the first coupling element is rotatably connected at a first end section with the first coupling rod and at a second end section with a second coupling rod and a first group of second slats is connected with the first coupling rod and a second group of second slats is connected with the second coupling rod.

3. The device according to claim 1, wherein the first coupling element is rotatable in common with the second control slat about the pivot axis (C) thereof and at a spacing from the pivot axis (C) of the second control slat is connected with the first coupling rod and the second coupling rod.

4. The device according to claim 2, wherein the lever arrangement comprises a second coupling element, which is rotatably coupled with the second bevel gear, with a first entrainer arranged eccentrically with respect to the axis (A) of rotation of the second coupling element and a lever element, which is rotatably arranged at the housing, with a first gate guide and a second gate guide respectively arranged at opposite sections at a spacing from the axis (B) of rotation of the lever element, wherein the first entrainer is guidably located in the first gate guide and a second entrainer is guidably located in the second gate guide and wherein the second entrainer is arranged in the first end section of the first coupling element and is rotatably connected with the first coupling rod.

5. The device according to claim 4, wherein the lever element has in the region of the second gate guide at least one abutment which limits the pivotation or swiveling of the second slats by way of the first coupling rod and/or the second coupling rod or by way of a guide at the housing.

6. The device according to claim 1, wherein the control element has a spherical end section received in a ball socket of the first control slat.

7. The device according to claim 1, wherein the second slats have a cross-section with at least one step.

8. The device according to claim 1, wherein the second slats have a seal at least at the outer edges thereof extending parallel to a pivot axis (C) and/or the housing has in the region of the second slats a seal at least at inner side walls extending parallel to the pivot axis (C) of the second slats.

9. The device according to claim 1, wherein at least a lever element of the lever arrangement, the first coupling rod and/or g second coupling rod and the first coupling element are arranged outside the housing.

10. The device according to claim 1, wherein the first control slat is coupled with at least one further slat pivotably mounted on the housing.

11. The device according to claim 3, wherein the lever arrangement comprises a second coupling element, which is rotatably coupled with the second bevel gear, with a first entrainer arranged eccentrically with respect to the axis (A) of rotation of the second coupling element and a lever element, which is rotatably arranged at the housing, with a first gate guide and a second gate guide respectively arranged at opposite sections at a spacing from the axis (B) of rotation of the lever element, wherein the first entrainer is guidably located in the first gate guide and a second entrainer is guidably located in the second gate guide and wherein the second entrainer is arranged in the first end section of the first coupling element and is rotatably connected with the first coupling rod.

12. The device according to claim 11, wherein the lever element has in the region of the second gate guide at least one abutment which limits the pivotation or swiveling of the second slats by way of the first coupling rod and/or the second coupling rod or by way of a guide at the housing.

13. A device for controlling an air flow, comprising at least one first control slat pivotably mounted in a housing and second slats extending orthogonally to the first control slat and pivotably mounted in the housing, wherein the direction of the air flow exiting from the housing is settable by way of the first control slat and the second slats and the amount of the exiting air is settable by way of the second slats, and a control element arranged by way of a mounting web at an air outlet region of the housing, wherein the control element is arranged at the mounting web to be pivotable orthogonally to a longitudinal axis of the first control slat and is coupled with a first bevel gear, which is rotatably mounted at the mounting web, and with the first control slat, the first bevel gear is disposed in engagement with a second bevel gear, the second bevel gear is rotatably arranged at the housing orthogonally to the first bevel gear, the second bevel gear is coupled with a lever arrangement, the lever arrangement comprises at least one rotatably mounted first coupling element coupled with at least one first coupling rod and the at least one first coupling rod is coupled with the second slats, wherein the control element has a spherical end section received in a ball socket of the first control slat.

14. The device according to claim 13, wherein one of the second slats is constructed as a second control slat and the first coupling element is connected with the second control slat, wherein parallelly arranged second slats extend on either side of the second control slat, wherein the first coupling element is rotatably connected at a first end section with the first coupling rod and at a second end section with a second coupling rod and a first group of second slats is connected with the first coupling rod and a second group of second slats is connected with the second coupling rod.

15. The device according to claim 13, wherein the first coupling element is rotatable in common with the second control slat about the pivot axis (C) thereof and at a spacing from the pivot axis (C) of the second control slat is connected with the first coupling rod and the second coupling rod.

16. The device according to claim 13, wherein the second slats have a cross-section with at least one step.

17. The device according to claim 13, wherein the second slats have a seal at least at the outer edges thereof extending parallel to a pivot axis (C) and/or the housing has in the region of the second slats a seal at least at inner side walls extending parallel to the pivot axis (C) of the second slats.

18. The device according to claim 13, wherein at least a lever element of the lever arrangement, the first coupling rod and/or a second coupling rod and the first coupling element are arranged outside the housing.

19. The device according to claim 13, wherein the first control slat is coupled with at least one further slat pivotably mounted on the housing.

20. The device according to claim 15, wherein the lever arrangement comprises a second coupling element, which is rotatably coupled with the second bevel gear, with a first entrainer arranged eccentrically with respect to the axis (A) of rotation of the second coupling element and a lever element, which is rotatably arranged at the housing, with a first gate guide and a second gate guide respectively arranged at opposite sections at a spacing from the axis (B) of rotation of the lever element, wherein the first entrainer is guidably located in the first gate guide and a second entrainer is guidably located in the second gate guide and wherein the second entrainer is arranged in the first end section of the first coupling element and is rotatably connected with the first coupling rod.

* * * * *

UNITED STATES PATENT AND TRADEMARK OFFICE
CERTIFICATE OF CORRECTION

PATENT NO. : 10,406,891 B2
APPLICATION NO. : 15/567924
DATED : September 10, 2019
INVENTOR(S) : Jenny Gareis, Jürgen Seemann and Gerhard Endres Page 1 of 1

It is certified that error appears in the above-identified patent and that said Letters Patent is hereby corrected as shown below:

In the Claims

Claim 9, Column 13, Line 33 "and/or g second" should be --and/or a second--

Signed and Sealed this
Twenty-first Day of January, 2020

Andrei Iancu
*Director of the United States Patent and Trademark Office*